United States Patent [19]

Allard

[11] 4,285,622
[45] Aug. 25, 1981

[54] APPARATUS FOR FEEDING MATERIAL OUT OF SILOS OR FROM STACKS

[75] Inventor: Louis R. Allard, Ile Bizard, Canada

[73] Assignee: Beloit Corporation, Beloit, Wis.

[21] Appl. No.: 63,901

[22] Filed: Aug. 6, 1979

[51] Int. Cl.³ ............................................. B65G 65/46
[52] U.S. Cl. .................................. 414/133; 414/307; 414/312
[58] Field of Search ................ 414/133, 145, 304–307, 414/310–312; 198/301

[56] References Cited

U.S. PATENT DOCUMENTS

| 3,608,752 | 9/1971 | Peterson et al. | 414/306 |
| 3,648,860 | 3/1972 | Wennberg . | |
| 3,896,943 | 7/1975 | Knutsen . | |
| 3,944,086 | 3/1976 | Frisz et al. | 414/307 |
| 4,099,632 | 7/1978 | Berg et al. | 414/312 |
| 4,206,840 | 6/1980 | Hanson | 198/301 |

OTHER PUBLICATIONS

*Bark = Money* Paper Trade Journal, Nov. 15, 1978.

*Primary Examiner*—Robert G. Sheridan
*Attorney, Agent, or Firm*—Dirk J. Veneman; Gerald A. Mathews; Michael L. Gill

[57] ABSTRACT

Apparatus for feeding material from a large supply of such material wherein a screw is horizontally disposed at the bottom of the piled material. Both ends of the screw are mounted in a trunnion bracket in a traversing carriage which supports the screw and allows axial movement relative to the trunnion carriages and skewing movement in a horizontal plane. A drive motor is mounted directly to the screw and is in turn supported in a trunnion bracket. Separate drive motors power the carriage at both ends of the screw. Proximity switches are disposed in conjunction with the front trunnion bracket to both limit the degree of skewing and to control the traversing motors on the carriages to keep the apparatus aligned and reciprocating beneath the piled material.

10 Claims, 7 Drawing Figures

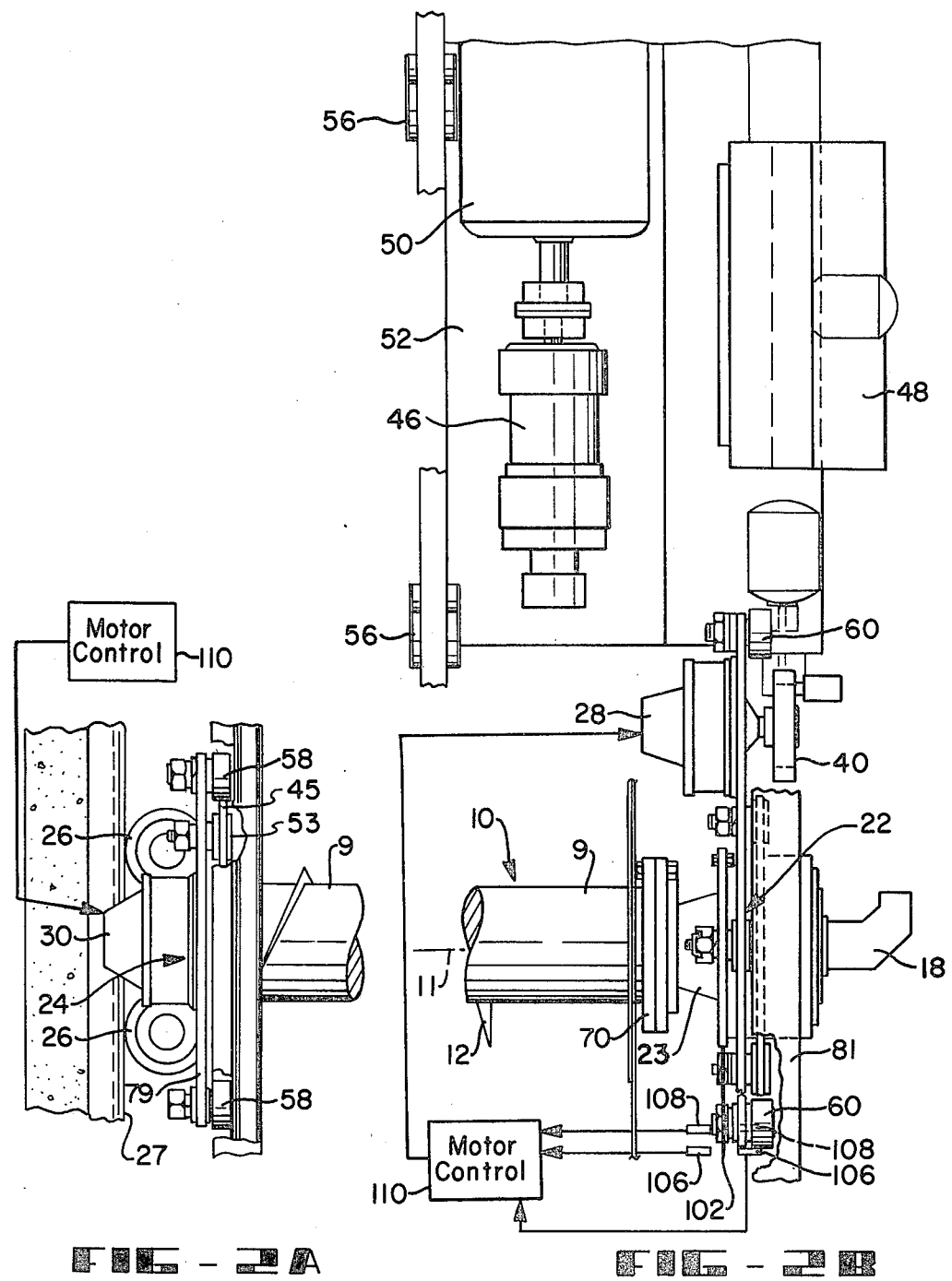

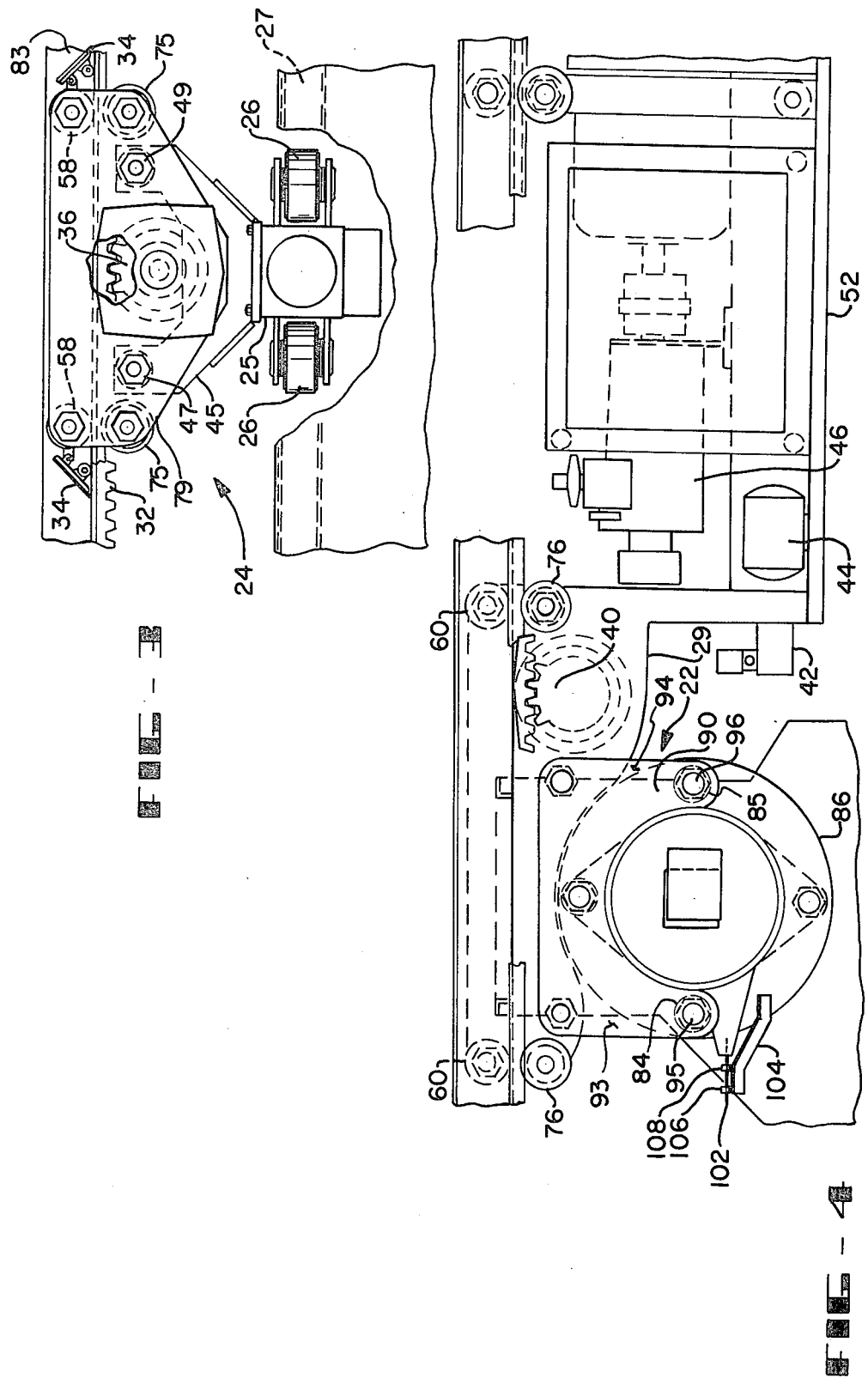

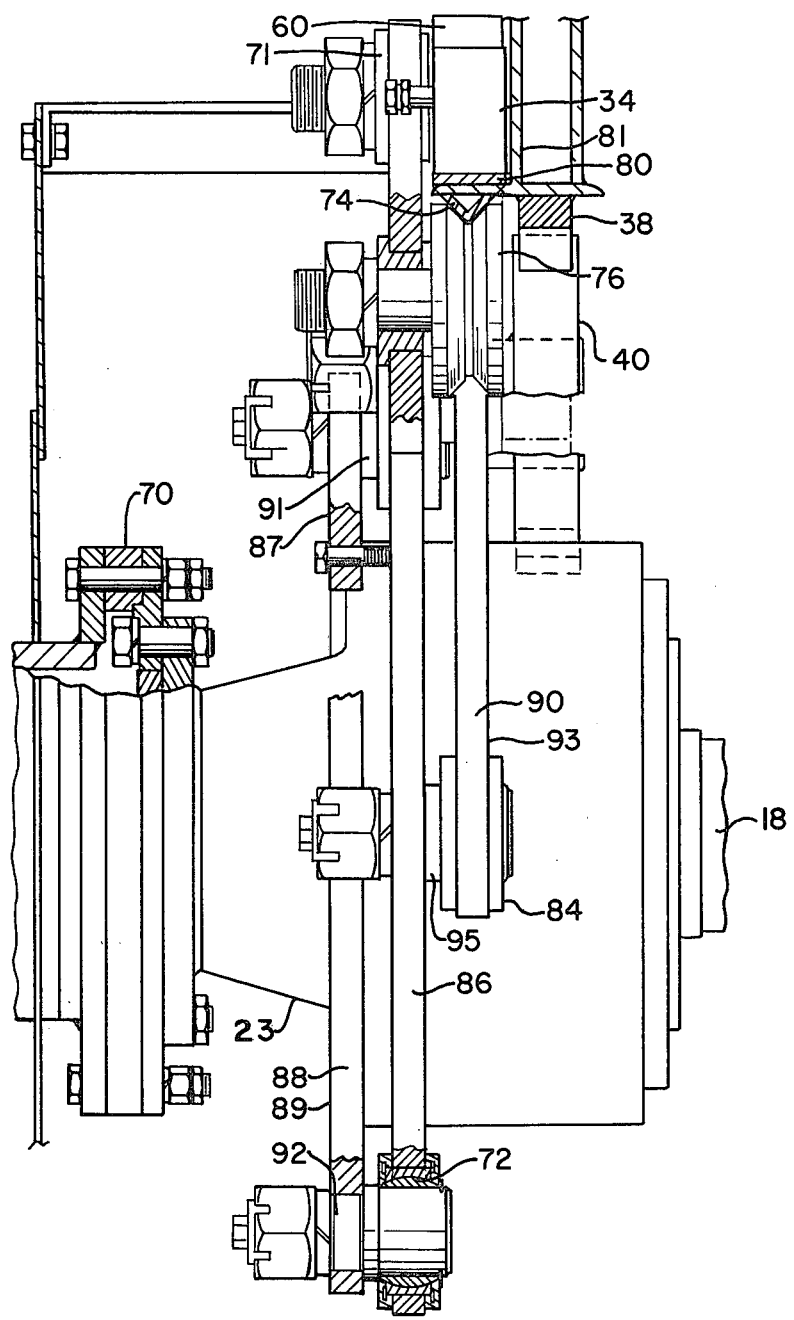

APPARATUS FOR FEEDING MATERIAL OUT OF SILOS OR FROM STACKS

BACKGROUND OF THE INVENTION

This invention relates to a traveling screw which is commonly used in the wood yard of a paper mill to extract wood chips from a silo or outdoor pile for conveyance to the pulping operation. More particularly, this invention relates to a unique manner of mounting the ends of the screw to accommodate a predetermined amount of axial movement and lateral skewing in the horizontal plane in which the screw travels in order to alleviate damaging stress in the screw and its mountings. It can also accommodate a small amount of vertical skewing.

Typical prior art traveling screw arrangements are shown in U.S. Pat. No. 3,648,860 and a C. J. Wennberg Co. advertisement entitled "Bank=Money" from the Nov. 15, 1978 issue of the Paper Trade Journal.

There are several ways of removing chips from a wood pile, such as loading a traveling conveyor belt with a bulldozer operating on a pile of chips stored outside. However, bulldozers require a very heavy capital investment as well as the labor cost of an operator. In addition, bulldozers tend to remove the chips from the top of a pile while the chips at the bottom remain for an overly long period of time which sometimes results in loss of usable fiber by biological-chemical reactions. In addition, the bulldozer tends to crush and ruin a portion of the chips in the normal course of its operation. By comparison, traveling screws remove chips from the bottom of a silo or outside stack so that the silo or stack can be replenished with fresh chips simultaneously with the removal of previously stored chips. This first-in-first-out procedure promotes uniformity in chip storage time and reduces loss due to biological/chemical reactions brought on by degeneration when chips have been stored for long periods of time, particularly outside.

However, in prior art types of traveling screws, there are often breakdowns in the traversing carriages, screw shaft or support mountings and the rack and pinion teeth by which the carriage is moved. Also, variations in the density, mechanical structure or degree of compaction of the material impose different forces and loads on the screw at different places along its length as it travels in its traversing movement. All of these factors can and do cause the screw to skew and move axially relative to its end mountings which are not capable of accommodating such movement. Eventually, there is a breakdown in either the drive mechanism or end support brackets and the entire screw halts. Ironically, these breakdowns are caused in part by the theoretically efficient design and operating characteristics of the mechanical system for powering the traversing movement of the screw. Such prior art screws are powered by one motor which operates a rack and pinion at one end and rotates a drive shaft extending through the cylindrical core of the screw to operate a similar rack and pinion at the far end. Each end of the screw is thus moved at the same speed which provides the uniform traverse movement under ideal conditions.

However, the tracks on which the carriage supporting the ends of the screw ride are not perfectly straight. Further, material often gets on the tracks and retards transverse movement of one end of the screw relative to the other end. Variations in the density and compaction of the material cause corresponding variations on the lateral forces acting against the screw as it travels transversely which causes one end of the screw to try to move relative to the other end. Thus, when, for any reason, one end of the screw doesn't move at the same speed as the other end, severe stresses are raised both within the screw cylinder, the internal driving shaft and the brackets in which the end bearings are mounted. Therefore, even though the prior art type of screw design should be efficient because it is powered by a single motor, and should move transversely at the same speed at both ends because of the shaft connecting the racks and pinions on either end, the screw in fact doesn't operate well in continuous service under a wide range of operating conditions.

These problems require more maintenance, supervision and downtime, all of which is costly. This is particularly true with regard to the downtime when repairing the flights on the screw or replacing the entire screw because the drive shaft extending through the screw core requires additional couplings at either end of the screw as well as some sort of support arrangement, such as a bearing, to support the shaft for rotation relative to the screw core. Further, sand is often present, particularly in hogged bark chips, and this causes the screw flights to wear rapidly so that the screw has to be replaced or repaired. The downtime to replace or repair the screw is very costly regardless of the cause.

SUMMARY OF THE INVENTION

This invention obviates the problems associated with screw misalignment in the plane of its transverse travel due to both imperfections in the tracks guiding the support carriages at either end of the screw and variations in the forces acting on the screw along its length due to nonuniformities in the material through which the screw is traversing. Its unique screw support apparatus also compensates for misalignments in the fabrication and installation of the equipment. Further, it utilizes a simpler, less costly screw.

On the discharge end of the screw, a hydraulic motor for rotating the screw has its drive shaft secured directly to the end of the screw's cylindrical core concentric with the axis of screw rotation. The motor housing itself is in turn secured to a trunnion plate which is part of an articulated double trunnion mounting bracket. The trunnion plate in which the rotational motor is mounted has upper and lower flanges extending vertically from the screw axis of rotation. A pair of spherical bushings, one each in the upper and lower flanges are located along a vertical line extending through the axis of screw rotation. Each spherical bushing supports a short shaft which is mounted into an intermediate plate behind the trunnion plate. The intermediate plate is in turn secured onto a pair of similar short shafts which are positioned in a horizontal plane on either side of the screw axis of rotation. The other ends of these shafts are mounted into a corresponding pair of spherical bushings which are mounted into a support plate linked with rollers for guiding the screw in its transverse movement along the guide rails.

The respective pairs of spherical bushings are thus located in planes which are at right angles to one another. In utilizing three plates in conjunction with the two sets of bushings in this configuration, the screw is supported by a double trunnion which allows both vertical and horizontal skewing of the screw within predetermined limits defined by the spherical bushings, and a proximity switch safety system. It also permits some axial movement of the screw to accommodate movement caused by variations in the alignment and construction of the guide rails. All of these movements of the screw are taken up by pivotal movement of the plates about the horizontal and vertical axes through pairs of spherical bushings.

The other (i.e. "free") end of the screw is supported with a single trunnion bracket arrangement. The difference between the ends is that there is no drive motor at the free end to rotate the screw since only one such drive motor is necessary, and the single trunnion bracket at the free end only accommodates rotation about a horizontal axis.

At the driven (i.e. discharge) end of the screw, the support plate from which the double trunnion bracket arrangement is suspended, supports a hydraulic motor which drives a pinion meshing with the teeth in a rack which extends along a pair of parallel rails to define the transverse path of screw travel. This arrangement isolates the screw from stress or unwanted movement resulting from traversing the relatively rigid screw over deviations in the alignment of the rails or the path of travel the support rollers take as they travel along the rail. It is intended to improve the reliability of the entire apparatus. Conversely, variations in the stress, strain and movement of the screw itself as it travels in its transverse path are not transmitted to the rack and pinion drives due to the ability of the double trunnion's first and intermediate plates on the discharge end of the screw to move independently of the support plates and thus accommodate some axial movement of the screw as well as skewing movement in essentially the horizontal direction. Some vertical screw misalignment is also accommodated.

By rotating the screw utilizing a motor attached directly to the cylindrical screw core, the screw itself can have wider, or longer exposed flights because there is no drive shaft extending through the screw core and thus there is no need for internal bearings to support the drive shaft or to provide space for sprockets to transmit rotating force. Further, skewing of the screw has no effect on the motor or the motor drive hub. Elimination of the internal drive shaft also permits the ends of the screw to be attached to the drive motor or rear support plate on their respective ends with simple flanges which facilitates the quick removal of the screw for repair or replacement.

In order to prevent damage to the screw, trunnion carriages or racks and pinions caused when some obstacle or condition prevents or restrains traversing movement of the trunnion carriage on one end of the screw relative to the other end, a safety system utilizing proximity switches is mounted on a bracket for use in conjunction with the first trunnion plate in the trunnion carriage. The proximity switches detect skewing movement of the screw relative to an imaginary plane perpendicular to the path of traversing travel along the rails. Depending on the direction of skewing, the switches control the speed of the hydraulic traversing motor at the appropriate end of the screw to stop long enough for the other end of the screw to catch up so it is again aligned properly.

The use of hydraulic motors to provide the traversing movement of the screw allows the screw to maintain a constant force in moving through the material even though the speed of such movement may vary according to nonuniformities in the density and compaction of the material.

Accordingly, it is an object of this invention to provide apparatus for supporting a traveling feed screw which allows for skewing movement of the screw relative to the traversing trunnion carriages and to prevent stress in the screw from being transmitted to the supporting apparatus.

Another object of this invention is to provide an apparatus for supporting and rotating a traveling feed screw wherein the power to rotate the screw is applied at only one end.

Still another object of this invention is to provide an apparatus for moving and rotating a traveling feed screw wherein the means to provide transverse movement of the screw are applied separately and independently to both ends of the screw.

A further object of this invention is to provide an apparatus for rotating a feed screw and providing power for the transverse movement of the screw wherein the screw can be quickly disengaged from the support and motive equipment.

A feature of this invention is the use of a screw which can utilize working flights for substantially the entire length of the screw core shaft.

These and other objects, features and advantages of the invention will become readily apparent to those skilled in the art when the following description of the preferred embodiment is read in conjunction with the attached drawings.

IN THE DRAWINGS

FIG. 2A is a plan view of the screw and end support apparatus shown in FIG. 1A. Some parts are shown broken away for clarity.

FIG. 2B is a plan view of the screw shown in FIG. 1B. Some parts are shown broken away for clarity.

FIG. 3 is an end elevational view of the free end of the screw in FIG. 1A. Again, some parts are broken away for clarity.

FIG. 4 is an end view of the discharge end of the screw shown in FIG. 1B. Here again, some parts are broken away for clarity.

FIG. 5 is an elevation view, partially in section, of the trunnion carriage and drive motor mounting arrangements on the discharge end of the screw shown in FIG. 1B.

DESCRIPTION OF THE PREFERRED EMBODIMENTS

Figure 1A:
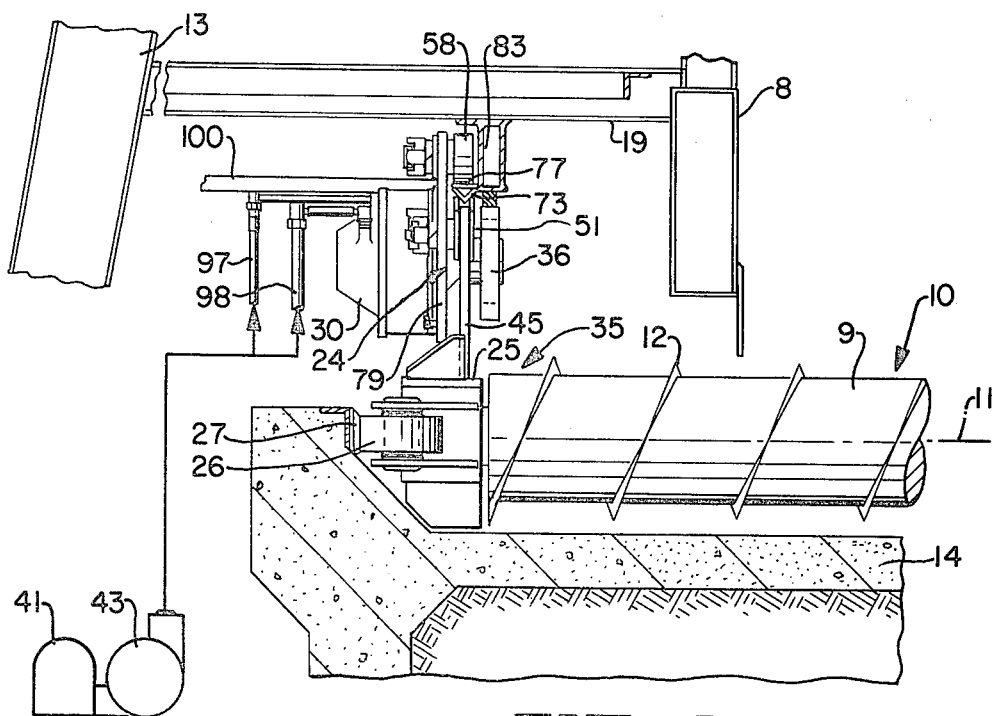
FIG. 1A is a front elevational view of the free end of the traversing feed screw showing the articulated trunnion carriage on either end.
Figure 1B:
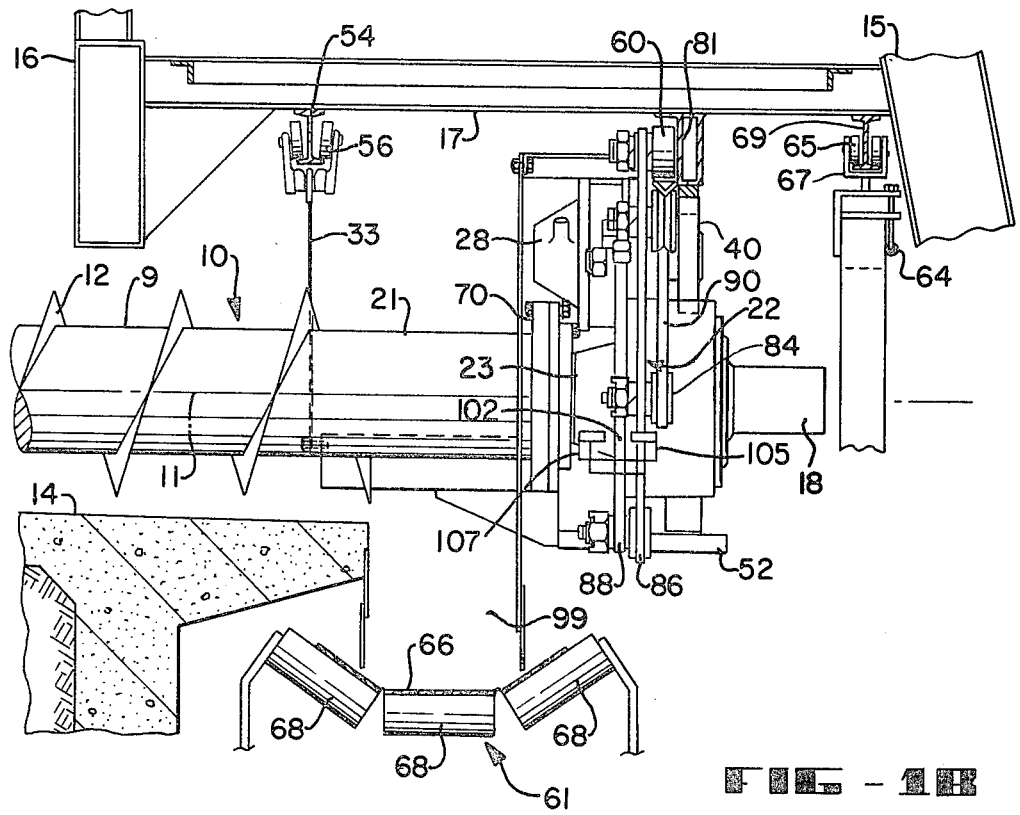
FIG. 1B is an elevational view of the opposite supported end of the feed screw shown in FIG. 1A.

As shown in FIG. 1, a feed screw 10 is in operating position near the bottom of a silo which is defined generally by a pair of parallel side walls 8, 16 extending substantially vertically over a concrete floor 14. The side walls 8, 16 are supported by a plurality of coextending external beams 13, 15 with their lower ends supported in footings extending along the outside of the silo and their upper ends forming a truss. A front and rear silo support ceiling 17, 19, respectively, extends horizontally between the corresponding external silo support beams 15, 13 and the silo walls 8, 16 in their positions extending above the feed screw 10.

By supporting the parallel side walls 8, 16, and another pair of end walls (not shown) which extend between the side walls at the ends thereof, from the plurality of external support beams 13, 15 forming a rigid external framework, the four walls defining the vertical periphery of the silo are spaced above the floor 14 all around the periphery of the silo. This allows the feed screw to traverse beneath the silo with its axis of rotation 11 in a horizontal plane.

The screw 10 is formed of a cylindrical core shaft 9, such as a steel pipe, to which hardened steel flights 12 are welded. As shown in FIG. 1, flights 12 have variable projection with the flight area gradually increasing in the axial direction toward the discharge end 21 of the screw near belt 66 on rollers 68 of conveyor 61. Floor 14 is stepped down near the discharge end to handle the increased volume. A hydraulic motor 18 is flange mounted to the planetary gear reducer 23. Variable displacement pump 46 includes a horsepower limiting control to provide additional torque during startup or temporary overloads. The output shaft of motor 18 thus rotatably drives the screw directly, although the motor and the output shaft are linked by a suitable gear reducer 23. The electric motor and pump are mounted on a motor carriage 52 which in turn is supported for rolling travel by a plurality of front and rear support rollers 60, 56, respectively, which travel along a pair of parallel extending support rails 81, 54, respectively, which are mounted to the bottom of silo support ceiling 17. The outer side of electric motor carriage 52 is attached to a mounting plate 29 in which support rollers 60 are mounted while the backside is supported by a pair of hangers 33 which extend beneath support rollers 56.

The rear, or so-called "free", end of the screw is rotatably mounted in a bearing housing 25. On either side of bearing housing 25, is a guide roller 26 which is rotatably mounted about vertical, parallel axes in such manner that the guide rollers 26 engage a guide plate 27 which extends horizontally along the inner side of the top edge of the foundation for the entire length of screw traversing travel. The guide plate 27 thus defines the furthest limit of axial movement of the feed screw toward the free end. The front (discharge) and rear (free) ends 21, 35, respectively, of the feed screw are vertically supported in corresponding front and rear trunnion carriages 22, 24, respectively.

With general reference to FIGS. 1-3, but with particular reference to FIGS. 4 and 5, the construction of the front trunnion carriage 22 will be described in detail. Screw rotational drive motor 18 has its output hub drive flange coupling 70 bolted directly to the screw core shaft 9. The motor and its gear reducer are in turn bolted directly onto a first trunnion plate 88. This first trunnion plate has a pair of vertically extending flanges 87, 89, extending upwardly and downwardly from the screw (and screw rotational reducer motor) axis of rotation 11, respectively. Near the ends in each of the upper and lower flanges 87, 89 is a support shaft 91, 92 respectively. The center lines of these shafts 91, 92 lie in a vertical plane extending through the screw axis of rotation 11. One end of these support shafts is bolted securely to the corresponding flanges 87, 89 on the first trunnion plate 88. The other ends of these support shafts 91, 92 are each mounted into a corresponding spherical bushing 71, 72 which in turn is secured into a circular intermediate plate 86. This permits the discharge end 21 of the screw, including the rotational drive reducer 23, to pivot about a vertical axis in a plane extending through the centers of both spherical bushings 71, 72 and the screw axis of rotation 11.

The first trunnion plate 88 is located on the inner side of intermediate plate 86 towards the flange coupling 70. On the other side of intermediate plate 86 is a support plate 90 which includes a horizontally extending upper portion and two arms 93, 94 which extend downwardly to the horizontal plane of the screw axis of rotation 11. In the lower ends of each of the support plate arms 93, 94, a corresponding spherical bushing 84, 85 similar to spherical bushings 71, 72, is mounted with each having a corresponding support shaft 95, 96 extending into the intermediate plate 86 and securely bolted therein. Thus, the pair of spherical bushings 84, 85 mounted in the support plate arms 93, 94 have their centers lying in a horizontal plane extending through the axis of screw rotation 11 and thereby permit the intermediate plate 86 to pivot about a horizontal axis and thereby permit some vertical and axial deviation in the motion of the discharge end of the screw 10.

The unique combination of pairs of spherical bushings mounted in the first trunnion plate 88 and arms of the support plate 90 in the manner described provide a controlled degree of ability of the screw to skew horizontally and move axially within the limits of the spherical bushings. Further, these skewing movements are independent of the transverse path of travel of the screw as defined by the front and rear trunnion carriages 22, 24 guiding over the corresponding front and rear support rails 81, 83, respectively.

Screw 10 is supported and driven in its transverse path of travel, which is perpendicular to its axis of rotation 11, by a pair of independently operated front and rear hydraulic traversing motors 28, 30, respectively. As shown in FIG. 4, front traversing motor 28 is bolted to mounting plate 29 on the inside surface toward screw 10. Its drive shaft extends through plate 29 and a pinion 40 is secured thereon to rotate about a horizontal axis.

This pinion engages the teeth in a front rack 38 which is attached to the bottom of front support rail 81 and extends horizontally therealong in the direction of traversing screw travel. Adjacent to the front rack 38, parallel thereto and spaced inwardly therefrom, is a "V" shaped guide rail 74 which is also attached to the bottom of support rail 81 and coextends with the front rack therealong. A pair of front guide rollers 76 with a mating groove are rotatably mounted in mounting plate 29 about horizontal axes to guide the front trunnion carriage 22 along the substantially straight path defined by the "V" shaped guide rail 74 and rack 38. Along the uppermost edge of mounting plate 29, a pair of front support rollers 60 are also rotatably mounted about parallel horizontal axes to bear against a wear track 80 which is mounted on the upper side of the same flange of support rail 81 from which the "V" shaped guide rail 74 is mounted immediately below. The front end of the screw is thus supported by the pair of front support rollers 60 acting through the front trunnion carriage 22 and guided by the pair of front guide rollers 76 which are mounted vertically beneath the front guide rollers 60 and rotate about parallel axes.

As shown in FIG. 3, the rear trunnion carriage 24 is somewhat similar in construction and operation to the front trunnion carriage 22. However, in the rear trunnion carriage 24, the hydraulic traversing motor 30 is mounted in a rear support plate 79 vertically above the rear bearing housing 25 which rotatably supports screw 10. A pair of rear support rollers 58 are mounted near the upper edge of support plate 79 to support the rear traversing carriage 24 on a wear track 77 in the same manner as front support rollers 60 engage wear track 80.

As shown in FIGS. 1 and 3, the screw bearing 25 is attached to a bifurcated mounting plate 45, the two arms of which extend vertically upwardly from the screw bearing 25. Near the upper ends of the arms are a pair of support shafts 47, 49, one in each arm, which are similar to support shafts 95, 96 in the front trunnion carriage. These support shafts 47, 49 have one end securely bolted to support plate 79 and extend inwardly toward the screw with their center axes parallel in a horizontal plane. At the other ends of the support shafts 47, 49, are a pair of corresponding spherical bushings 51, 53 which are mounted in the respective arms of bifurcated mounting plate 45 in the same manner as described with regard to corresponding parts in front trunnion carriage 22. The spherical bushings 51, 53 permit the bifurcated plate 45 to pivot about a horizontal axis to accommodate slight vertical deviations in the path of travel of the rear trunnion carriage 24 as it travels along support rail 83. It also permits the screw to move slightly axially toward the front (discharge) end.

Rear traversing motor 30 is bolted to rear support plate 79. Its drive hub extends through the opening in the bifurcated plate 45 and has a rear pinion 36 secured thereon. The rear pinion engages the teeth of a rear rack 32 which is mounted on the underside of a rear screw support rail 83 in the same manner as described in conjunction with corresponding parts on the front of the screw. A pair of rear guide rollers 75 are rotatably mounted in rear support plate 79 with their axes of rotation in a horizontal plane so that their grooved rollers engage the "V" shaped rear guide rail 73 to guide the rear trunnion carriage 24 as it travels in its horizontal path parallel to front guide rail 74. Above the rear guide rollers 75 are a pair of rear support rollers 58 which engage the wear track 77 to support the rear trunnion carriage 24 and screw 10. On both the front and rear trunnion carriages 22, 24 are a pair of scrapers such as shown, for example, at 34 on the rear trunnion carriage 24 in FIG. 3. These scrapers clear the front and rear wear tracks 80, 77 of any debris which might otherwise hamper the smooth passage of the support rollers on their respective tracks.

Referring to FIGS. 1, 2 and 4, mounting plate 29 has a downwardly extending leg portion which supports one corner of motor carriage 52. The other corner on the same side of motor carriage 52 is supported by a similar leg which extends downwardly from a third front support roller 60. The inner corners of the two tiered motor carriage 52 are supported from hangers 33 which extend downwardly from their corresponding motor carriage support rollers 56. The motor carriage supports a large electrical motor 50 (i.e. about 100 hp) which is connected to a hydraulic pump 46 which in turn supplies hydraulic fluid to the screw rotation drive motor 18. Rotating screw 10 at its normal rotational speed of about 30 rpm to about 60 rpm requires considerable power so the flow of oil required from pump 46 is in the range of about 75 to about 120 gallons per minute. Screw 10 may be rotated at speeds as low as about 5-10 rpm under certain conditions. A cooler 48 is positioned beside the motor 50 to cool oil returning from the hydraulic motor 18. Hydraulic screw rotational motor 18 is fed by a pump equipped with a horsepower limiter varying the pump displacement in response to the system pressure limiting power to a preselected value. This control provides the additional torque during starts or temporary overloads.

Also located on the motor carriage 52 is a smaller electric motor 44 of about 2 hp size. This smaller motor powers a hydraulic pump 42 having a dual range pressure compensator which is hydraulically linked with the front traversing motor 28. The electrical power for these motors 50, 44 is supplied by a festooned electrical cable 64 which moves up and down a rail 69 on a small carriage 67 which is supported on the rail with support wheels 65. Both the front and rear traversing motors require little power so the quantity of hydraulic fluid pumped by pump 42 is relatively small, such as in the range of about 1 gallon per minute. The pressure compensator control automatically reduces delivery of hydraulic fluid when resistance to the transverse motion of the screw travel exceeds a preset pressure. Traversing speed might vary from about ½ foot/minute to about 3 feet/minute. Since the screw 10 must always rotate in the same direction in order to deposit material onto conveyor 61, the power required of the front and rear traversing motors 28, 30 differs according to whether the screw is being moved in one direction through the chips or in the opposite direction. This is due to the effect that the screw flights have while they are rotating as the screw itself is moving transversely through the material. As shown in FIG. 1, for example, the screw would require less power to move in its transverse path of travel when it is moving toward the viewer and more power when moving from the viewer. Thus, the pressure compensator control provides two independent adjustable pressure compensator settings, selected by an integral solenoid control, depending on the direction of feed screw transverse movement.

There is no traveling carriage at the rear, or free, end 35 of the screw because there is no power supplied to rotate the screw at that end. The only motor at the free end of the screw is traversing motor 30 which only requires a small motor 41 and pump 43 of the same small size, such as about 2 hp, corresponding to motor 44 and pump 42 used on the front side. Since so little flow of hydraulic fluid is required to provide the traversing power of rear traversing motor 30, hydraulic cables 97, 98 are not of a large diameter and can easily be festooned as shown in FIG. 1. These hydraulic cables are festooned from an outrigger 100 attached to the rear trunnion carriage which can easily support their weight due to their relatively small (i.e. about ⅜ in. inside diameter). Since the hoses used on the rear end of the screw are so small, they can easily be carried by the outrigger, thus eliminating the need for a traveling carriage and its support rollers on the rear end of the screw. Motor 41 and pump 43 are stationary and mounted outside the structure supporting screw 10.

In operation, the screw is mounted horizontally for lateral translation near the bottom of the silo or outdoor pile of material, as the case may be. Motor 50 drives a pump 46 which supplies hydraulic fluid to the screw rotating motor 18 to rotate the screw so that the flights 12 carry the material from the free end of the screw toward the front and where it is urged into a trough 99 extending in the direction of transverse screw travel over a conveyor 61 which conveys the material to another location for further processing.

Pumps 42 and 43 power the front and rear traversing motors 28, 30, respectively, which cause their pinions 40, 36 to engage their racks 38, 32 and move the screw transversely. As the screw moves through the material, such as wood chips or bark, the material deposited onto conveyor 61 is replaced by other material falling behind the screw.

As the screw rotates and moves the material into trough 99, the reaction force induced axially on the screw in the opposite direction is taken up by guide rollers 26 bearing against guide plate 27 which defines the extent of the axial movement of the screw toward the free end 35.

Regardless of whether the material is stored in a silo or in an open pile outside, the trunnion carriages at either end are sheltered by the overhanging support ceilings 17, 19 which also served to provide the structural support for the support rails 54, 81, 83. In a silo, these support ceilings are attached to the spaced, vertical silo walls 8, 16. When used in conjunction with an open pile, these support ceilings are at or near ground level and there are no external support beams 13, 15. Both the silo and outside pile support structures themselves are well known in the industry.

Ideally, of course, the front and rear trunnion carriages will move the screw transversely at the same speed on both ends of the screw and the screw will remain perpendicular to the direction of travel. However, as the trunnion carriages reciprocate back and forth, the screw will from time to time encounter variations in the compaction of the material which will locally increase or decrease resistance along the screw core to transverse movement. At the ends of the screw, these variations will be manifested in one trunnion carriage being relatively further along the path of travel compared with the other trunnion carriage, particularly since the hydraulic traversing motors 28, 30 maintain a constant force against the ends of the screw (i.e. constant torque on the drive pinions) so the speed of the carriages will then vary with the power required for movement. This speed variation helps keep the rate of extraction of the material more uniform because it compensates for increases or decreases in the degree of compaction.

Any variation in the speed of the drive pinions on either end of the screw will naturally cause the screw to skew in a horizontal plane. This lateral skewing is intended to be accommodated by the spherical bushings 71, 72 in the double trunnion arrangement in the front carriage. As the screw skews, the flange coupling 70, reducer 23 and first trunnion plate 89 all turn with it with no stress or strain because the support shafts 91, 92 on which they are mounted can turn freely about a vertical axis through the spherical bushings 71, 72. Further, no stress, strain or twisting forces are transmitted to the front rack and pinion since the rack and pinion are isolated from the screw and its movement by the trunnion arrangement. It is intended that these bushings accommodate skewing up to about 3° in either direction so that the front trunnion carriage can be either ahead of or behind the rear trunnion carriage. It should be noted that this horizontal skewing can be entirely accommodated by the bushings 71, 72 on the front trunnion carriage and no corresponding pair of bushings need be provided on the rear trunnion carriage. All skewing at the rear end is accommodated by self-aligning bearing included in the bearing housing 25.

During operation, the screw might also encounter an especially dense or compacted portion of material which resists the efforts of the screw flights to cut through it. In addition, either or both of the guide rails and wear tracks might be misaligned either vertically or horizontally, either of which conditions would otherwise cause the screw to move axially to follow the deviation. In order to accommodate such axial movement, both ends of the screw are mounted onto trunnions which pivot about a horizontal axis. As in the case of horizontal skewing accommodated by the vertical trunnion arrangement on the front trunnion carriage, this axial movement at either end of the screw toward the discharge end, or the free end carriage toward the free end in the event the free end rail deviates away from the screw, is accommodated by the horizontal trunnion arrangements at either end of the screw without affecting the support or guide rollers or the engagement of the racks and pinions.

In order to prevent damage to the apparatus in the event that the screw encounters something which it cannot get past, or if either traversing motor or their racks and pinions become jammed so that one end of the screw is urged to travel beyond about 3° past the other end, a proximity switch arrangement is provided on the trunnion carriage at the discharge end to sense this skewing condition.

With reference to FIGS. 1, 2 and 4, a horizontally extending rod 102 is mounted to the first trunnion plate 88. A bifurcated bracket 104 is mounted to intermediate plate 86 and has its opposed arms 105, 107 straddling rod 102. Two pairs of proximity switches 106, 108 are mounted on the arms so that when the screw is in its normal position perpendicular to the direction of its traversing travel, rod 102 extends between the pairs of parallel proximity switches, one of each pair of switches being mounted opposite the other switch on the opposed arms 105, 107 with the rod centered between them.

When the screw starts to skew in the horizontal plane of its axis of rotation, rod 102 moves toward one of switches 106. These switches are operatively linked to a motor control 110 which can start and stop the front and rear traversing motors 28, 30. Therefore, when the front end of the screw gets ahead of the rear end, trunnion plate 88 pivots relative to the intermediate plate 86 and rod 102 turns toward the switch on outer arm 105. Likewise, the rod turns toward the switch on inner arm 107 when the front trunnion carriage gets behind the rear trunnion carriage. When the anti-skewing switch 106 on either arm 105 or 107 senses the proximity of rod 102 according to the distance of the rod and setting of the switch, it interrupts the operation of the appropriate traversing motor 28, 30 to cause the trunnion carriage that is ahead of the other trunnion carriage to halt until the proximity switches 106 senses that rod 102 is far enough from both switches 106 so that the screw is properly aligned and both traversing motors can operate again. At the end of each traverse, the trunnion carriages encounter a reversing switch (not shown) which reverses the traversing motors and the screw travels the other way. Such reversing switches and their use are well known in the art so they won't be explained further.

This apparatus has an important operating advantage in the event the screw flights break or the screw becomes jammed or otherwise disabled while the silo is still filled with material, or there is still substantial material in the outside pile, as the case may be. In both cases, ready access to the prior art type screw and their mountings for repairs is limited at best and is usually virtually impossible. In this invention, the ends of the screw are beneath the overhead support ceilings 17, 19, so the screw can be readily unbolted and removed since there is no internal drive shaft extending through the screw core 9 which would prevent lateral separation of the screw from its trunnion carriages. Thus, after the damaged or inoperative screw has been unbolted, both the front and rear trunnion carriages can be driven to the ends of their tracks which extend outside of the silo or beyond the pile of material. There, a new screw can be attached and the apparatus operated in a normal manner up to the location of the damaged screw and back. This accomplishes both the removal of most of the remaining material in the silo or pile and also permits easier subsequent access to the damaged screw for repair or removal.

In the event the horizontal skewing of the screw becomes excessive to the extent that it might damage any of the apparatus, a second set of proximity switches 108 are mounted in opposed array on the arms 105, 107 with the rod 102 therebetween. These over-skewing switches 108 are spaced inwardly toward the screw from the anti-skewing switches 106 so that they are not activated until the screw has skewed beyond its design limits, such as beyond about 3° in either direction, or they may become activated in the case where anti-skewing switches 106 fail to operate. In any event, over-skewing switches 108 function to signal the traversing motor control 110 to deactivate both traversing motors 28, 30 until the cause of the problem has been ascertained and remedied at which time the screw can be put back into operation.

While the invention has been described in conjunction with its application in a silo or beneath an outdoor pile of wood chips, or other shavings, chips or particulate material, where the feed screw reciprocates to traverse the material in a direction perpendicular to its axis of rotation, it is clear that the principles of the invention can be applied to other configurations which would be obvious to someone skilled in the arts accordingly, it is intended that other configurations, such as a feed screw which pivots about a central axis and either reciprocates about a partial circle or rotates in a complete circle, are within the spirit and scope of invention. Also, the double trunnion carriage described in conjunction with the front of the screw could also be used on the free end of the screw.

Finally, since this invention alleviates conditions wherein the apparatus frequently breaks down and requires repairs, and has various switches to start, stop and reverse its movement, it is quite reliable and can be operated without a human operator. This is of great economic value, especially when compared with other systems requiring one or more persons to operate the equipment.

What is claimed is:

1. In a traveling screw apparatus for removing material from a stored quantity of such material, the apparatus including a screw having a core and flights, means for rotatably supporting the screw at both the front and rear ends, support structure including a pair of support rails for carrying the weight of both ends of the screw, a motor for rotating the screw, means for moving the screw along the support rails transversely to the axis of screw rotation, wherein the improvement comprises:

the front and rear ends of the screw are rotatably mounted in corresponding front and rear trunnion carriages which permit the screw to skew relative to its traversing path of travel along the support rails, one of said trunnion carriages including a double trunnion arrangement which permits movement of its associated end of the screw substantially both horizontally and vertically whereby the screw can move both axially toward and away from the other trunnion carriage as well as skew in a horizontal plane;

the front and rear trunnion carriages are mounted on the support rails for travel therealong;

the means for moving the screw include a traversing motor mounted to each trunnion carriage which engages the support structure and powers the trunnion carriages upon the corresponding support rail, said motors being independently operable to control the alignment of the screw relative to its direction of travel.

2. The apparatus as set forth in claim 1, wherein:

the screw rotating motor is mounted directly to one end of the screw and is in turn mounted in a trunnion carriage whereby relative movement between the screw and trunnion carriage can occur to isolate horizontal skewing of the screw from affecting movement of the trunnion carriage along its path of travel on the support rail.

3. The apparatus as set forth in claim 1, wherein:

one trunnion carriage includes a single trunnion permitting pivotal movement of the screw about a horizontal axis.

4. In a traveling screw apparatus for removing material from a stored quantity of such material, the apparatus including a screw having a core and flights, means for rotatably supporting the screw at both the front and rear ends, support structure including a pair of support rails for carrying the weight of both ends of the screw, a motor for rotating the screw, means for moving the screw along the support rails transversely to the axis of screw rotation, wherein the improvement comprises:

the front and rear ends of the screw are rotatably mounted in corresponding front and rear trunnion carriages which permit the screw to skew relative to its traversing path of travel along the support rails, and wherein, (1) the first trunnion carriage includes,
  (a) a first trunnion plate having a pair of aligned first support shafts extending from the plate,
  (b) an intermediate plate receiving the ends of the support shafts therein,
  (c) a support plate having a pair of aligned second support shafts mounted therein and having their other ends mounted in the support plate,
  (d) both said first and second pairs of support shafts each have one of their ends mounted in spherical bushings in at least one of said plates,
  (e) the axes through the first and second pairs of support shafts are disposed at substantially right angles to one another, (2) the rear trunnion carriage includes,
  (a) a support plate having a pair of horizontally aligned rear support shafts extending from the support plate,
  (b) a second plate receiving the ends of the rear support shafts therein,
  (c) the ends of the rear support shafts are mounted in spherical bushings in one of plates;

a bearing housing in which the rear end of the screw is rotatably mounted, said bearing housing being mounted on one of said plates;

the front and rear trunnion carriages are mounted on the support rails for travel therealong;

the means for moving the screw include a traversing motor mounted to each trunnion carriage which operably engages the support structure and powers the trunnion carriages upon the corresponding support rail, said motors being independently operable to control the alignment of the screw relative to its direction of travel.

5. Apparatus as set forth in claim 4, further including:
means for controlling the screw alignment relative to its path of traversing travel, said means comprising,
 (a) an indicator attached to the first trunnion carriage for indicating skewing of the screw,
 (b) proximity switches for sensing the position of the indicator and generating a signal to the appropriate traversing motor to halt to realign the screw as desired and then to again commence operating.

6. Apparatus as set forth in claim 4, wherein:
the motor for rotating the screw has its drive shaft mounted directly to the screw core and is itself mounted to the first trunnion plate so that there is no relative movement between said motor and the first trunnion plate.

7. Apparatus as set forth in claim 4, wherein:
the means for moving the screw include a rack mounted to the support structure at both ends of the screw, and a pinion mounted to the traversing motor on each trunnion carriage and engaging the corresponding rack whereby operation of the motors positively moves the trunnion carriages along the support rails.

8. Apparatus as set forth in claim 4, wherein:
the first support shafts on the first trunnion plate are fixedly secured therein and aligned vertically;
the second support shafts on the support plate are pivotally mounted in spherical bushings therein and aligned horizontally, whereby skewing movement of the screw is accommodated without imposing lateral forces on the trunnion carriages.

9. In a traveling screw apparatus for removing material from a stored quantity of such material, the apparatus including a screw having a core and flights, means for rotatably supporting the screw at both the front and rear ends, support structure including a pair of support rails for carrying the weight of both ends of the screw, a motor for rotating the screw, means for moving the screw along the support rail transversely to the axis of screw rotation, wherein the improvement comprises:
the front and rear ends of the screw are rotatably mounted in corresponding front and rear trunnion carriages which permit the screw to skew relative to its traversing path of travel along the support rails, and wherein,
(1) the first trunnion carriage includes,
 (a) a first trunnion plate having a pair of vertically aligned first support shafts extending from the plate,
 (b) an intermediate plate receiving the ends of the support shafts in spherical bushings therein,
 (c) a support plate having a pair of horizontally aligned second support shafts mounted in spherical bushings therein and having their other ends mounted in the support plate,
(2) the rear trunnion carriage includes,
 (a) a support plate having a pair of horizontally aligned rear support shafts extending from the support plate,
 (b) a second plate receiving the ends of the rear support shafts in spherical bushings therein,
the motor for rotating the screw is operably linked directly to the screw core and is in turn mounted to the first trunnion plate whereby horizontal skewing of the screw turns the first trunnion plate about its vertically aligned support shafts with no relative movement between the core and rotating motor;
a bearing housing mounted to said second plate, said bearing housing rotatably supporting the rear end of the screw whereby some axial movement of the screw away from the rear end thereof is accommodated by a pivotal movement of the rear support shafts in their spherical bushings;
the front and rear trunnion carriages are mounted on support rails for travel therealong;
the support structure includes a rack on each end of the screw extending in the direction of traversing travel along the support rails;
the means for moving the screw include a traversing motor mounted to each trunnion carriage, each traversing motor having a pinion mounted thereon which operably engages the corresponding rack whereby the trunnion carriages are moved along the support rails, said motors being independently operable to control the alignment of the screw relative to its direction of travel.

10. Apparatus as set forth in claim 9, further including:
a rod mounted to the first trunnion plate;
a pair of proximity switches mounted to the first trunnion carriage and operably disposed about the rod whereby skewing the screw causes the proximity switches to sense the change in position of the rod and generate a signal to the traversing motor on the trunnion carriage which is ahead of the other trunnion carriage to halt the leading trunnion carriage until the proximity switches sense the return of the screw to the desired alignment whereupon they signal the idle traversing motor to resume operation with the other traversing motor.

* * * * *